US005548410A

United States Patent [19]
Kim et al.

[11] Patent Number: 5,548,410
[45] Date of Patent: Aug. 20, 1996

[54] ANALOG-CUM-DIGITAL VIDEO RECORDING AND REPRODUCING DEVICE

[75] Inventors: SooKyung Kim; Joong Kwon-Joh; WeonKyoo Lee, all of Seoul, Rep. of Korea

[73] Assignee: LG Electronics Co., Ltd., Seoul, Rep. of Korea

[21] Appl. No.: 401,491

[22] Filed: Mar. 10, 1995

[30] Foreign Application Priority Data

Mar. 11, 1994 [KR]  Rep. of Korea .................. 4842/1994

[51] Int. Cl.$^6$ .............................. H04N 5/76; G11B 5/00; G11B 5/02; G11B 5/09
[52] U.S. Cl. ................. 358/341; 360/18; 360/32
[58] Field of Search ................... 358/335, 342, 358/341, 343, 906, 909.1; 360/32, 19.1, 18; H04N 5/76

[56] References Cited

U.S. PATENT DOCUMENTS

| | | | |
|---|---|---|---|
| 4,609,949 | 9/1986 | Kutaragi | 360/28 |
| 5,128,775 | 7/1992 | Suzuki et al. | 358/343 |
| 5,195,073 | 3/1993 | Kato et al. | 369/47 |
| 5,335,125 | 8/1994 | Nakatsu et al. | 360/10.3 |

*Primary Examiner*—Thai Q. Fran
*Assistant Examiner*—Y. Lee
*Attorney, Agent, or Firm*—Finnegan, Henderson, Farabow, Garrett & Dunner, L.L.P.

[57] ABSTRACT

An analog-cum-digital video recording and reproducing device which can perform recording and reproduction of HDTV digital signals as well signals as well as recording and reproduction of VHS analog signals is disclosed. The device has separate recording and reproduction processing systems for processing HDTV digital signals and VHS analog signals, digital recording and reproduction heads, and analog recording and reproduction heads, which can perform selective recording and reproduction of HDTV digital video signals and VHS analog video signals on or from a VHS tape by controlling running of the tape and rotation of the head drum to speeds appropriate to the respective signal processing system. It further allows use of an existing VHS or S-VHS tape for recording and reproduction of analog or digital video signals by providing means for interchangeable reproduction of an existing VHS tape, which allows recording of the high quality HDTV signals on a ½" VHS tape. The device can control the mode to be put into a digital recording mode or an analog recording mode when performing a recording according to the selection of a user, and can make automatic changeover to a digital reproduction mode or an analog reproduction mode according to determination of the kind of signals reproduced from a recorded tape when performing a reproduction. The device can record and reproduce analog video signals and digital video signals into high-quality images by mounting heads for an analog signal band as well as heads for a digital signal band on one head drum.

13 Claims, 4 Drawing Sheets

ANALOG-CUM-DIGITAL VIDEO RECORDING AND REPRODUCING DEVICE

BACKGROUND OF THE INVENTION

1. Field of the Invention

This invention relates to an analog-cum-digital video recording and reproducing device which can perform recording and reproduction of HDTV digital signals as well as recording and reproduction of VHS analog signals.

2. Discussion of the Related Art

Conventional video recording and reproduction devices present problems in that recording and reproducing devices for HDTV digital signals and VHS analog signals need to be supplied in separate sets due to the differences in processing the signals, and the two systems have no interchangeability, as the HDTV digital signals cannot be recorded on, or reproduced from, a VHS tape.

That is, a VCR of VHS or S-VHS type according to the present NTSC or PAL method for recording analog video signals has a recording bandwidth of 5 MHz in case of VHS and 7 MHz in case of S-VHS. Accordingly, the conventional VCR for recording and reproduction of analog signals includes, for meeting such a recording bandwidth, one pair of video heads for recording video signals in 5 MHz or 7 MHz, a record reproduction amplifier for amplifying analog video signals picked up at the heads, and a signal processing circuit for reproduction of the amplified signals. At this time, the relative speed of a head drum with a diameter of 62 mm, matched to the recording wavelength of the video signals, is 1800 rpm, i.e., 5.8 m/sec.

In the case of digital signals like HDTV signals, since the quantity of video signal information required for one image is at least two times that of analog signal information required for the same image, a longer period of recording time is required. The recording should be in a higher concentration than an analog method in order to match the amount of tape required for recording the digital signal information to the similar level required for the analog signal information.

Accordingly, the recording and reproduction device for digital video signals includes, for recording the signals, one pair of video heads for recording video signals over 15 MHz bandwidth, a record reproduction amplifier for amplifying digital video signals picked up at the video heads, and a signal processing circuit for processing the amplified signals. The speed of the head drum matched to the recording wavelength of the video signal is 3600 rpm, i.e., 11.6 m/sec for a drum of 62 mm diameter.

Therefore, when carrying out digital recording or reproduction of one channel with the heads, since the recording or reproduction frequency bandwidth the head should take care of is 30 Mbps, i.e., about 15 MHz if it is digital data, the digital recording and reproduction requires high-performance heads as well as a relative speed between the head drum and the tape of more than 10 m/sec, which results in difficulty of running control.

Moreover, the recording and reproduction system for recording and reproduction of such digital video signals (in some cases, digital signals containing audio signals) presents a problem in that the system has no interchangeability with the VHS method of recording and reproduction of analog video signals (in some cases, analog signals containing audio signals).

SUMMARY OF THE INVENTION

Therefore, the object of this invention is to provide an analog-cum-digital video recording and reproduction device having separate recording and reproduction processing systems for processing HDTV digital signals and VHS analog signals, digital recording and reproduction heads, and analog recording and reproduction heads, which can perform selective recording and reproduction of HDTV digital video signals and VHS analog video signals on or from a VHS tape by controlling running of the tape and rotation of the head drum to speeds appropriate to each respective signal processing system.

Another object of this invention is to provide an analog-cum-digital video recording and reproduction device, which allows the use of an existing VHS or S-VHS tape for recording and reproduction of analog or digital video signals by providing means for interchanged reproduction of an existing VHS tape, which allows recording of the high quality HDTV signals on ½" VHS tape.

Still another object of this invention is to provide an ananalog-cum-digital video recording and reproduction device, which can select either digital recording and reproduction or analog recording and reproduction through controlling modes of recording and reproduction of analog or digital video signals in response to an order of a user and signals while assuring the interchangeability to the maximum by maintaining the existing helical running method.

A further object of this invention is to provide an analog-cum-digital video recording and reproduction device that can control the mode to be put into a digital recording mode or an analog recording mode when performing a recording according to the selection of a user and can make automatic changeover to a digital reproduction mode or an analog reproduction mode according to determination of the kind of signals reproduced from a recorded tape when performing a reproduction.

Still a further object of this invention is to provide an analog-cum-digital video recording and reproduction device that can record and reproduce analog video signals and digital video signals into high-quality images by mounting heads for an analog signal band as well as heads for a digital signal band on one head drum.

These and other objects and features of this invention can be achieved by providing an analog-cum-digital video recording and reproduction device, including a signal reception selection part for selecting video signals to be recorded from applied analog video signals and digital video signals; an analog recording signal processing part for processing analog video signals received from the signal reception selection part in a suitable recording format; an analog head part for reproduction of the analog video signals recorded on a videotape and recording the analog video signals received from the analog recording signal processing part; an analog recording and reproduction path selection part for applying the video signals processed at the analog recording signal processing part to the analog head part for recording or transmitting the video signals reproduced at the analog head part; an analog reproduction signal processing part for processing the reproduced video signals selected at and received from the analog recording and reproduction path selection part in a suitable reproduction format; a digital recording signal processing part for processing the digital video signals received from the signal reception selection part in a suitable recording format; a digital head part for reproduction of the digital video signals recorded on a videotape and recording the digital video signals received from the digital recording signal processing part; a digital recording and reproduction path selection part for applying the video signals processed at the digital recording signal processing part to the digital head part for recording or transmitting the video signals reproduced at the digital head part; a digital reproduction signal processing part for processing the reproduced video signals selected at and received from the digital recording and reproduction path selection part in a suitable reproduction format; an output signal selection part for selecting and transmitting either the signals received from the analog reproduction signal processing part or the signals received from the digital reproduction signal processing part; an audio control head for recording and reproduction of audio and control signals on and from a videotape; a comparison part for comparing the reproduced control signals received from the audio control head to the signals received from the analog reproduction signal processing part and the digital reproduction signal processing part; and a control part for controlling the signal reception selection part, the audio control head, the analog recording and reproduction path selection part, the digital recording and reproduction path selection part, the output signal selection part, the analog head part, and the digital head part in response to the signals received from the comparison part.

DESCRIPTION OF THE PREFERRED EMBODIMENTS

Figure 1:
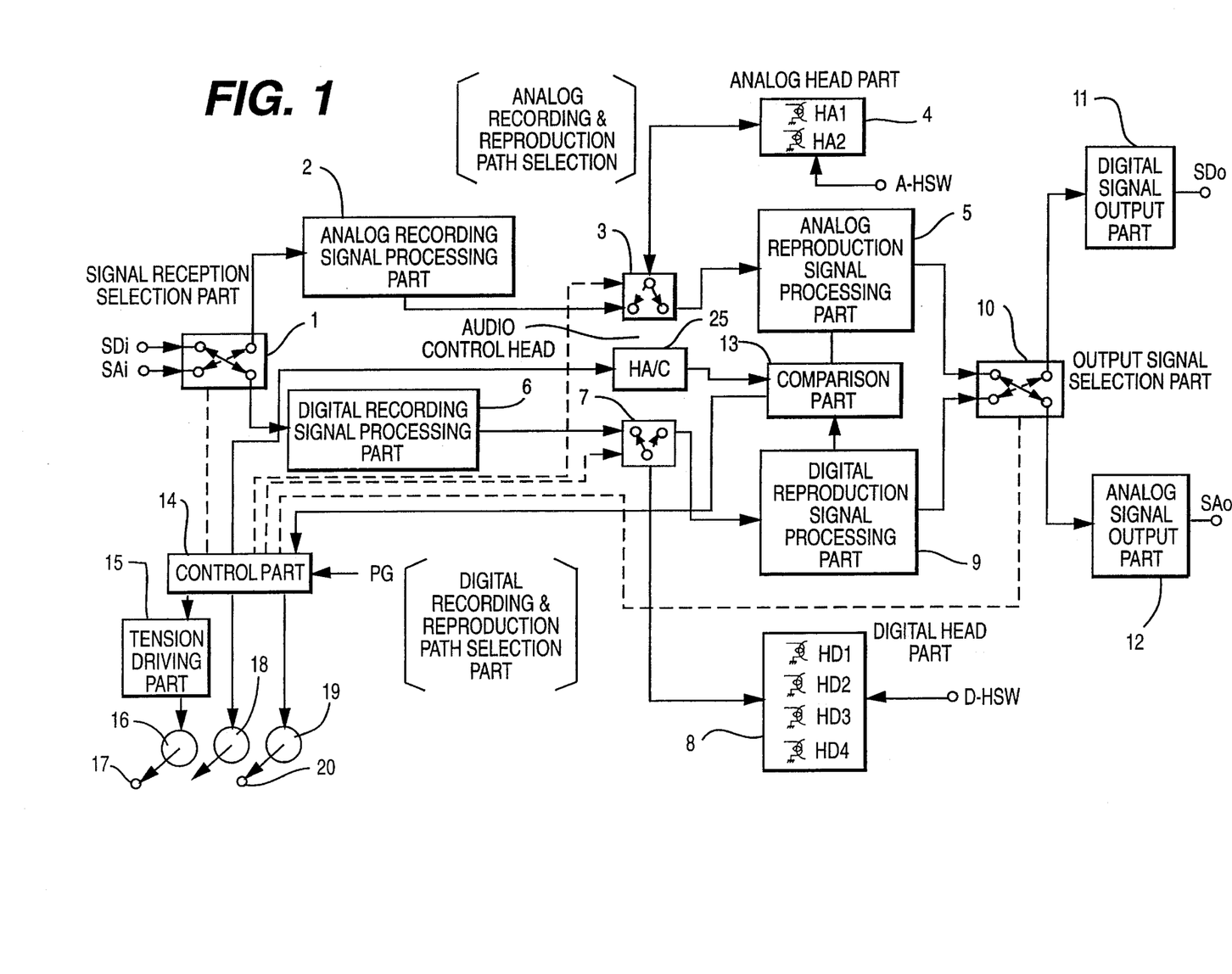
FIG. 1 shows an entire system for an analog-cum-digital video recording and reproduction device in accordance with a preferred embodiment of this invention.

AS shown in FIG. 1, an analog-cum-digital video recording and reproduction device, in accordance with one embodiment of this invention, includes a signal reception selection part 1, an analog recording signal processing part 2, an analog head part 4, an analog recording and reproduction path selection part 3, an analog reproduction signal processing part 5, a digital recording signal processing part 6, a digital head part 8, a digital recording and reproduction path selection part 7, a digital reproduction signal processing part 9, an output signal selection part 10, a digital signal output part 11, an analog signal output part 12, an audio control head 25, a comparison part 13, a control part 14, a tension driving part 15, a tension motor 16, a tension post 17, a drum motor 18, a capstan motor 19, and a capstan 20.

The signal reception selection part 1 selects a video signal to be recorded from the analog video signal SAi and the digital video signal SDi and applies the selected video signal to the analog recording signal processing part 2 or the digital recording signal processing part 6.

The analog recording signal processing part 2 processes the analog video signals received from the signal reception selection part 1 to a suitable recording format.

The analog head part 4 reproduces the analog video signals recorded on videotape and records the analog video signals received from the analog recording signal processing part 2.

The analog recording and reproduction path selection part 3 applies the video signals processed at the analog recording signal processing part 2 to the analog head part 4 for recording, or transmits the video signals reproduced at the analog head part 4.

The analog reproduction signal processing part 5 processes the reproduced video signals selected at, and received from, the analog recording and reproduction path selection part 3 in a suitable reproduction format.

The digital recording signal processing part 6 processes the digital video signals received from the signal reception selection part 1 in a suitable recording format.

The digital head part 8 reproduces the digital video signals recorded on videotape, and records the digital video signals received from the digital recording signal processing part 6 on videotape.

The digital recording and reproduction path selection part 7 applies the video signals processed at the digital recording signal processing part 6 to the digital head part 8 for recording, or transmits the video signals reproduced at the digital head part 8.

The digital reproduction signal processing part 9 processes the reproduced video signals selected at, and received from the digital recording and reproduction path selection part 7 in a suitable reproduction format.

The output signal selection part 10 selects and transmits either the signals received from the analog reproduction signal processing part 5 or the signals received from the digital reproduction signal processing part 9.

The audio control head 25 records and reproduces audio and control signals on and from videotape.

The comparison part 13 compares the reproduced control signals received from the audio control head 25 with the signals received from the analog reproduction signal processing part 5 and the digital reproduction signal processing part 9, and applies the result of comparison to the control part 14.

The control part 14 controls the signal reception selection part 1, the audio control head 25, the analog recording and recording path selection part 3, the digital recording and reproduction path selection part 7, the output signal selection part 10, the analog head part 4, and the digital head part 8.

The digital signal output part 11 processes the digital reproduction signals selected at, and received from, the output signal selection part 10 suitably to display on a monitor and presents the selected signals to the monitor.

The analog signal output part 12 processes the analog reproduction signals selected at, and received from, the output signal selection part 10 suitably to display on a monitor, and presents the selected signals to the monitor.

The tension driving part 15 and the tension motor 16 adjust the tension of the tape under the control of the control part 14.

The tension post 17, driven by the tension motor 16, adjusts the tension of the videotape.

The drum motor 18 drives the head drum having the analog head part 4 and the digital head part 8 under the control of the control part 14.

The capstan motor 19 drives a capstan 20 for running a videotape under the control of the control part 14.

Figure 2:
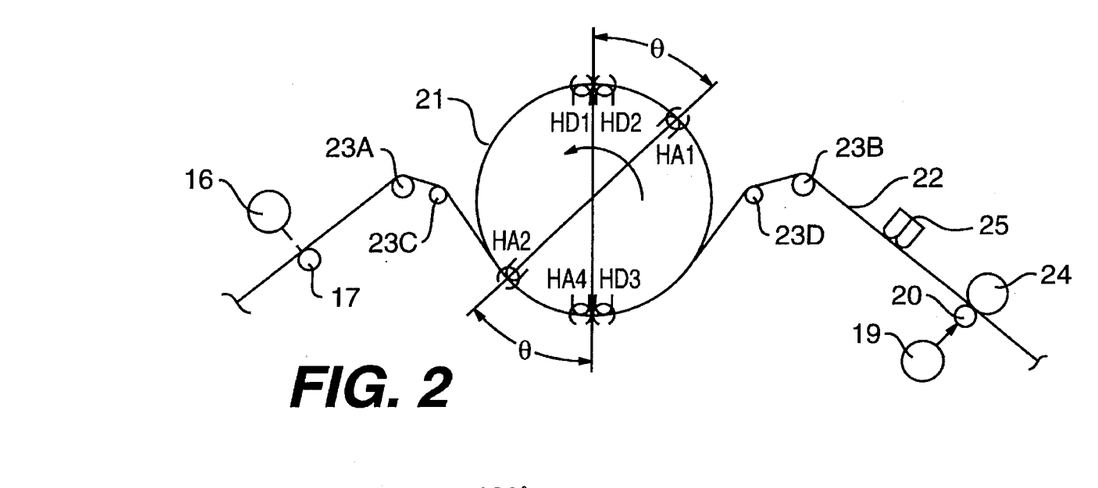
FIG. 2 is detail of a head drum in accordance with a preferred embodiment of this invention.
Figure 3:
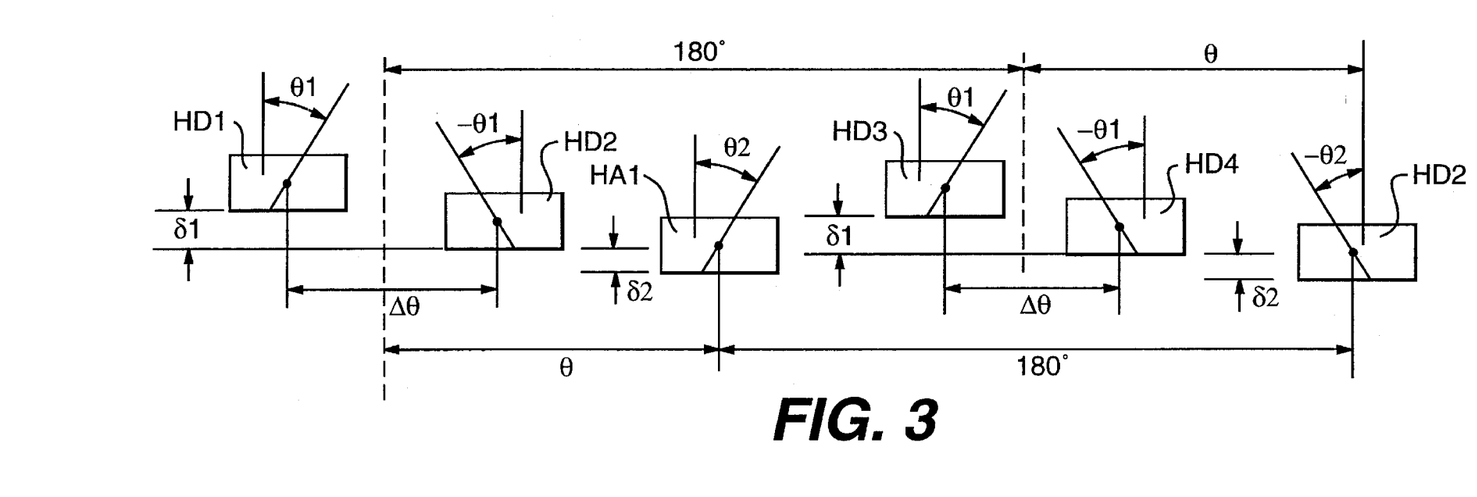
FIG. 3 shows phase angles and steps of the heads of FIG. 2.

Referring to FIGS. 2 and 3, the analog head part 4 and the digital head part 8 will be explained in detail, hereinafter.

There are a pair of guide rollers 23A and 23B and a pair of slant posts 23C and 23D in the front and rear sides of the head drum 21. The tension post 17 is in the front side with respect to the tape running direction for controlling the operation of the tension motor 16. The audio control head 25 records and reproduces the audio and control signals on and from the tape passed through the drum. The capstan 20 is driven by the capstan motor 19 together with the pinch roller 24 for maintaining the running speed of the videotape constant.

The videotape 22 is made to contact the head drum 21 at an angle of contact of more than 180° by the guide rollers 23A and 23B and the slant posts 23C and 23D, and the head drum 21 is rotated by the drum motor 18 at a speed of 3600 rpm or 1800 rpm in recording and reproduction of digital signals, and at a speed of 1800 rpm in recording and reproduction of analog signals.

As shown in FIG. 2, the analog head part 4 and the digital head part 8 mounted on the same drum 21 include two pairs of digital heads, HD1 and HD3 and HD2 and HD4, each pair positioned opposite to the other pair on the drum 21 at an angle of 180°, and one pair of analog heads HA1 and HA2, each positioned opposite to each other on the drum 21 at an angle of 180° respectively arranged in the order of HD1 HD2 HA1 HD3 HD4 HA2 HD1 with regard to the direction of rotation of the drum 21.

The double azimuth heads HD1 and HD2 have signals applied at the same time for recording or reproduction of digital signals, and the other double azimuth heads HD3 and HD4 that appear after 180° from the application of a head-switching signal also have signals applied at the same time for recording or reproduction.

Herein, the one pair of analog heads HA1 and HA2 are mounted at a specific phase angle θ with respect to the two pairs of digital heads HD1 and HD3, and HD2 and HD4.

As shown in FIG. 3, the one pair of digital heads HD2 and HD4 is mounted to have a difference of height of δ1 from the adjacent pair of digital heads HD1 and HD2, and each of the analog heads HA1 and HA2 is mounted to have a difference of height of δ2 from the one pair of digital heads HD2 and HD4.

As shown in FIG. 3, each one of the one pair of adjacent digital heads HD1 and HD2, and HD3 and HD4 are mounted on the drum 21 to have a difference of a phase angle of Δθ relative to each other.

The digital heads HD1 and HD3, and HD2 and HD4 are composed of double azimuth heads HD1 and HD3, and HD2 and HD4, with azimuth angles ±θ1 of ±15° so that they can record and reproduce digital video signals having a great amount of information like the video signals of an HDTV.

The analog heads HA1 and HA2 are composed of azimuth heads with azimuth angles ±θ2 of ±6° for interchangeable recording and reproduction of VHS tape.

Based on the signals generated by a phase generator mounted on the head drum 21, the control part 14 controls switching of the signal reception selection part 1, the analog recording and reproduction path selection part 3, the digital recording and reproduction path selection part 7, and the output signal selection part 10 for switching the heads HD1, HD2, HD3, HD4, HA1, and HA2.

The operation of the analog-cum-digital video recording and reproduction device, in accordance with one embodiment of this invention, will now be explained.

First, the case of recording digital signals will be explained.

Control part 14 begins the control of the system after receiving an order to record digital video signals.

Upon receiving the order for recording the digital video signals, the control part 14 controls the signal reception selection part 1 to be switched to the digital signal SDi reception terminal, and controls the digital recording and reproduction path selection part 7 to be switched to the digital recording signal processing part 6.

The control part 14 controls the capstan motor 19 to run the tape 22 via the capstan 20, and controls the drum motor 18 to rotate the drum 21 for making a helical scan of the running tape 22.

The digital signal SDi to be recorded is applied to the digital recording signal processing part 6 through the signal reception selection part 1, and undergoes an initial amplification, modulation, and an equalizing amplification. It is then applied to the digital head part 8 for recording according to switching of the digital recording and reproduction path selection part 7.

Figure 4A:
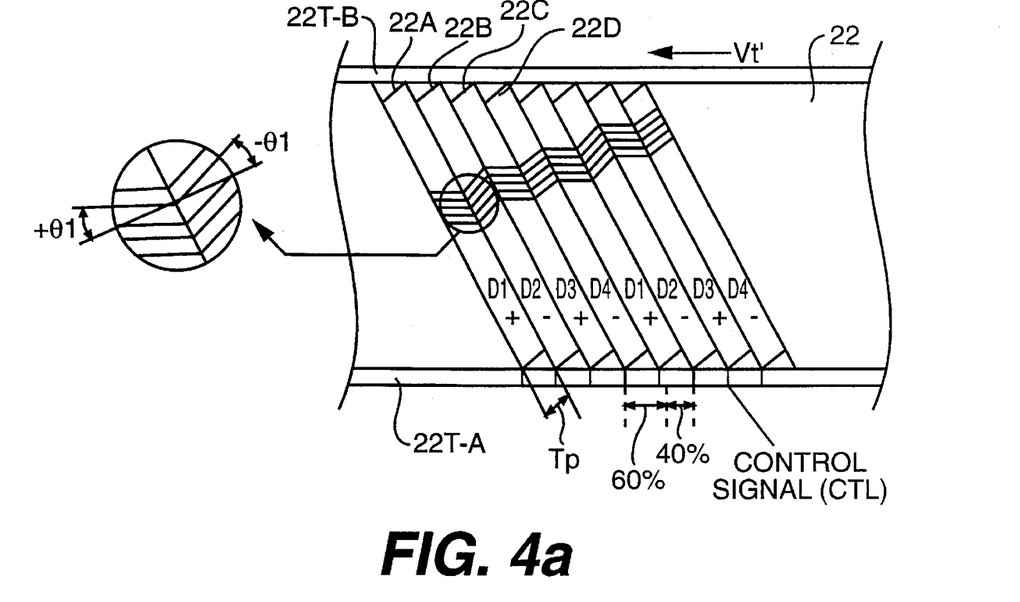
FIG. 4a shows a recording format for recording digital signals on videotape in accordance with this invention.

Accordingly, the digital signal can be recorded on the tape 22 transferring in a speed Vt' by the capstan motor 19 and the capstan 20 in a pattern as shown in FIG. 4a.

Figure 5A:
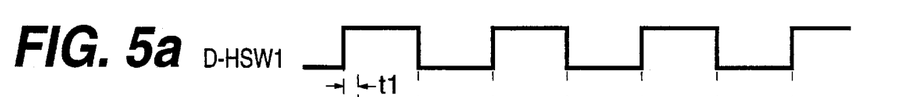
FIGS. 5a–5o are signal wave patterns at the various parts in FIGS. 1 and 2.
Figures 5B, 5C:
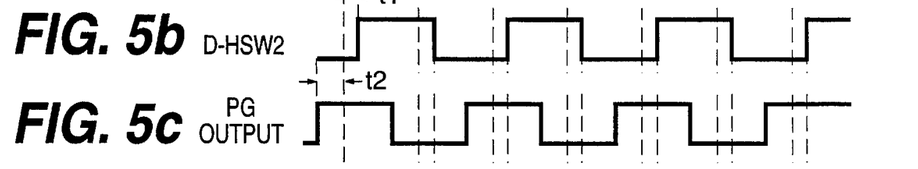
Figures 5D, 5E, 5F, 5G:
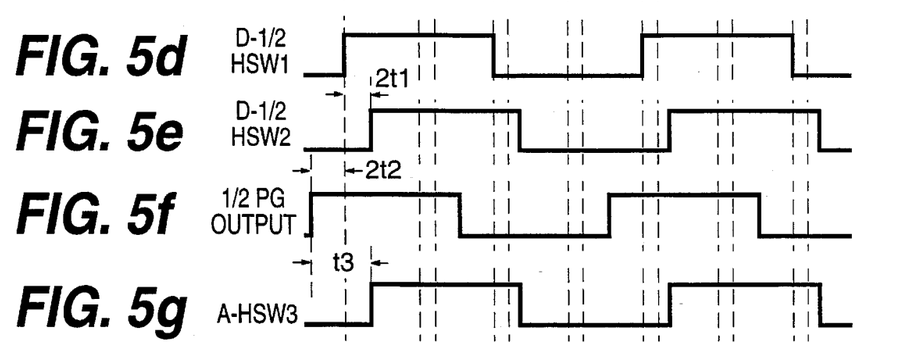
Figure 5H:
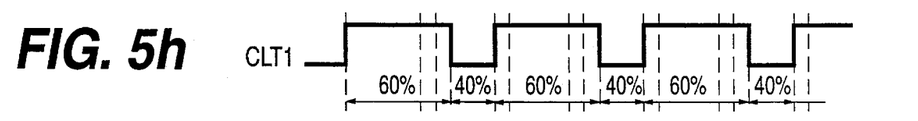
Figure 5I:
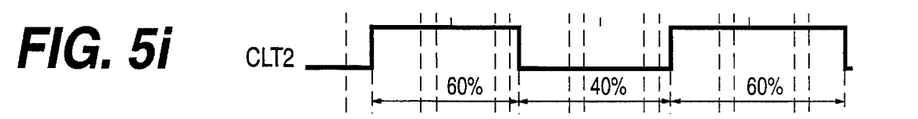

At this time, timing control signals CLT1 and CLT2 as shown in FIGS. 5h and 5i are recorded on the tape 22 at a lower track 22T-A thereof through the audio control head 25 under the control of the control part 14.

Meanwhile, the head drum 21 driven by the drum motor 18 under the control of the control part 14 runs in 3600 rpm or 1800 rpm, and the speed Vt' of the tape 22 transferred by the capstan motor 19 and the capstan 20 is Vt'–Vt in case of 3600 rpm and Vt'–Vt/2 in case of 1800 rpm. Herein, Vt=33.35 mm/sec, which is the VHS standard transfer speed.

Referring to FIG. 4a, a digital recording pattern formed on the tape 22, based on the standard layout of the heads shown in FIGS. 2 and 3, has inclined tracks 22A, 22B, 22C, and 22D with an azimuth angle of ±15° and a fixed track pitch (Tp'=14.5 μm) per one revolution, the timing control signal CLT1, as shown in FIG. 5h, in case running speed of the tape 22 Vt'=Vt and the timing control signal CLT2, shown in FIG. 5i, in case running speed of the tape 22 Vt'=Vt/2 at the lower track 22T-A thereof, and audio signals at a upper track 22T-B thereof, as required.

The upper track 22T-A for audio signals may not be required since the digital signal can be a signal containing entire signals of the video signal and the audio signal, but it is provided for the cases when it is desired to record audio signals using the audio control head 25 on it as an extra.

Since the tension on the videotape 22 can vary depending on both the rotation speed of the head drum 21 and the transferring speed of the tape 22, the control part 14 controls the tension driving part 15 to drive the tension post 17 through the tension motor 16 for adjusting the tension on the tape 22 to be suited to the speed of the tape 22 and the drum 21.

Second, the case of recording analog signals will be explained.

Upon application of an order for recording an analog video signal, the control part 14, receiving the order, controls the system. Upon receiving the order for recording the analog video signal, the control part 14 controls the signal reception selection part 1 to be switched to the analog signal SAi reception terminal and controls the analog recording and reproduction path selection part 3 to be switched to the analog recording signal processing part 2.

The control part 14 controls the capstan motor 19 to run the tape 22 via the capstan 20 and controls the drum motor 18 to rotate the drum 21 for making a helical scan of the running tape 22.

The analog signal SAi to be recorded is applied to the analog recording signal processing part 2 through the signal reception selection part 1, and undergoes an initial amplification, modulation, and an equalizing amplification. It is then applied to the analog head part 4 for recording according to switching of the analog recording and reproduction path selection part 3.

Figure 4B:
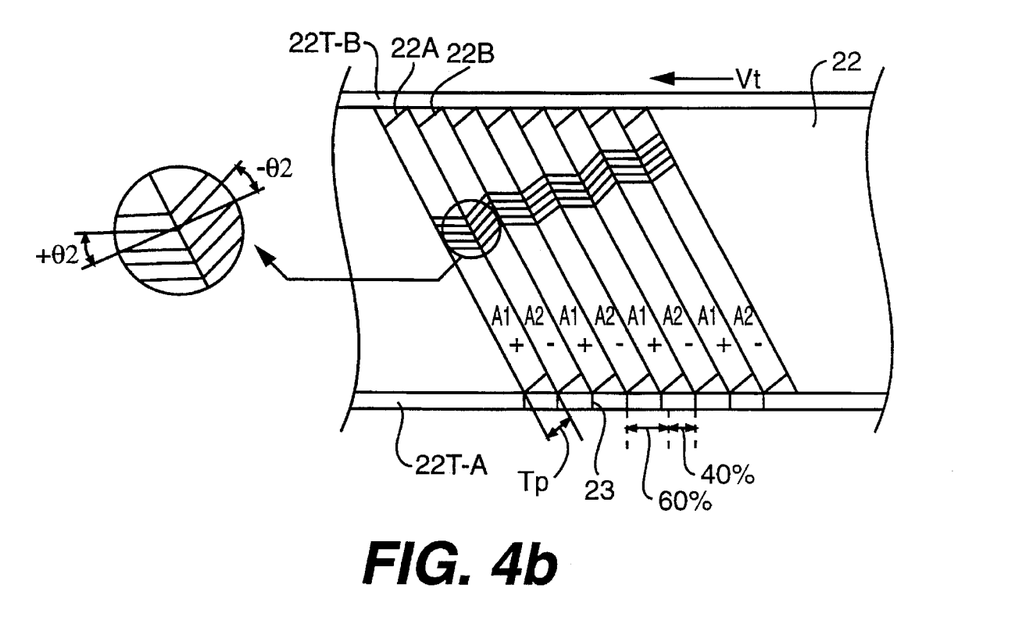
FIG. 4b shows a recording format for recording analog signals on videotape in accordance with this invention.

Accordingly, the analog signal can be recorded on the tape 22 transferred at a speed Vt by the capstan motor 19 and the capstan 20 in a pattern shown in FIG. 4b.

At this time, the timing control signal CLT2 as shown in FIG. 5i is recorded on the tape 22 at the lower track 22T-A thereof through the audio control head 25 under the control of the control part 14.

Meanwhile, the head drum 21, driven by the drum motor 18 under the control of the control part 14, runs at 1800 rpm, and at the speed Vt of the tape 22 transferred by the capstan motor 19, and the capstan 20. Vt is 33.35 mm/sec, which is the VHS standard transfer speed.

Referring to FIG. 4b, according to the teachings of the present invention, an analog recording pattern can be interchangeable with the conventional VHS standard tape pattern. This interchangeability is possible because an analog recording pattern formed on the tape 22 based on the standard layout of the heads shown in FIGS. 2 and 3 has inclined tracks 22A and 22B with azimuth angles of ±6° and a fixed track pitch (Tp=58 μm) per one revolution, and the timing control signal CLT1 shown in FIG. 5h at the lower track 22T-A thereof, since running speed of the tape 22 is Vt.

Audio signals are recorded on the upper track 22T-B using the audio control head 25.

Since the tension on the videotape 22 can vary depending on both the rotation speed of the head drum 21 and the transferring speed of the tape 22, the control part 14 controls the tension driving part 15 to drive the tension post 17 through the tension motor 16 for adjusting the tension on the tape 22 to be suited to the speed of the tape 22 and the drum 21.

Third, a case of reproducing either a digital signal or an analog signal will be explained with reference to FIG. 1.

In a reproduction mode of a video signal, the control part 14, after determining whether the signal reproduction is analog or digital (based on the result of the comparison of the comparison part 13), controls switching of the analog recording and reproduction path selection part 3, the digital recording and reproduction path selection part 7, and the output signal selection part 10.

That is, upon receiving an order for a reproduction mode, the control part 14 controls the analog recording and reproduction path selection part 3 to be switched to the analog reproduction signal processing part 5 side, and controls the digital recording and reproduction path selection part 7 to be switched to the digital reproduction signal processing part 9 side.

Therefore, in case the reproduction signal is an analog video signal, the signal reproduced by the analog heads HA1 and HA2 of the analog head part 4 is applied to the analog reproduction signal processing part 5 through the analog recording and reproduction path selection part 3. There, the signal undergoes initial amplification, demodulation, and equalizing amplification. It is then applied to the output signal selection part 10 and the comparison part 13.

At this time, the audio control head 25 reproduces the timing control signal CLT1, as shown in FIG. 5h, recorded on the lower track 22T-A, as shown in FIG. 4b, and applies the reproduced timing control signal CLT1 to the comparison part 13.

Figure 5J:
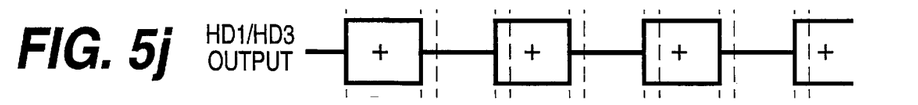
Figure 5K:
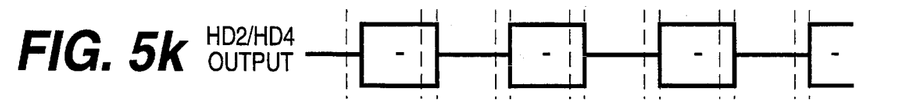
Figure 5L:
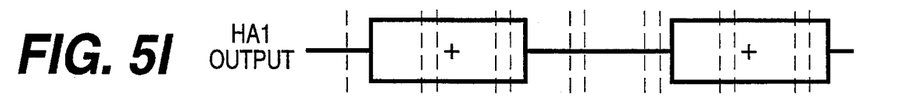
Figure 5M:
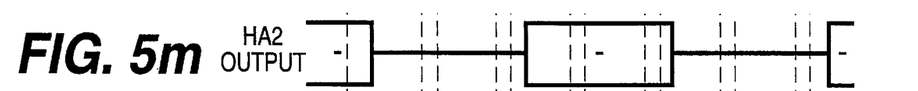
Figure 5N:
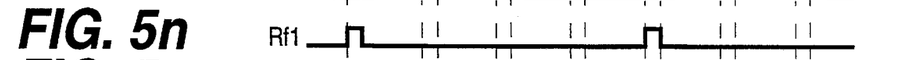

Therefore, during reproduction of the analog signal, the analog video signals as shown in FIGS. 5l and 5m from the analog heads HA1 and HA2, and the timing control signal CLT1, as shown in FIG. 5h, are applied to, and compared in, the comparison part 13. As the result of the comparison, a timing detection signal Rf1, as shown in FIG. 5n, is generated and applied to the control part 14.

On the other hand, in case the reproduction signal is a digital video signal, the signal reproduced by the digital heads HD1 and HD3, and HD2 and HD4 of the digital head part, are applied to the digital reproduction signal processing part 9 through the digital recording and reproduction path selection part 7. There, the signal undergoes initial amplification, demodulation, and equalizing amplification. It is then applied to the output signal selection part 10 and the comparison part 13.

At this time, the audio control head 25 reproduces the timing control signals CLT1 and CLT2, as shown in FIGS. 5h and 5i, recorded on the lower track 22T-A as shown in FIG. 4a, and applies the reproduced timing control signals CLT1 and CLT2 to the output signal selection part 10 and the comparison part 13.

Figure 5O:
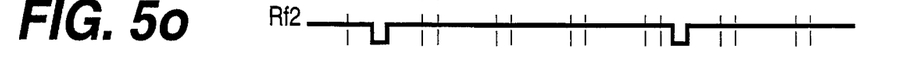

Accordingly, during reproduction of the digital signal, the digital video signals, as shown in FIGS. 5j and 5k from the digital heads HD1 and HD3, HD2 and HD4, and the timing control signals CLT1 and CLT2 as shown in FIG. 5h and 5i, are applied to, and compared in the comparison part 13. As the result of the comparison, a timing detection signal Rf2 as shown in FIG. 5o is generated and applied to the control part 14.

Therefore, the control part 14 can determine whether an analog signal or a digital signal is under reproduction at the present time using the received detection signal Rf1 or Rf2. If it is analog signal reproduction, the control part 14 controls the output signal selection part 10 to be switched to the analog reproduction signal processing part 5 and the analog signal output part 12. If it is digital signal reproduction, the control part 14 controls the output signal selection part 10 to be switched to the digital reproduction signal processing part 9 and the digital signal output part 11.

According to the result of the determination, the control part 14 controls the analog recording and reproduction path selection part 3 and the digital recording and reproduction path selection part 7 to be switched, appropriate to the reproduction mode of relevant signal. The control part 14 also controls revolutions of the drum motor 18 and the capstan motor 19 appropriate to record video signals based on the detection signals Rf1 and Rf2.

The foregoing switching control of the analog recording and reproduction path selection part 3, the digital recording and reproduction path selection part 7, and the output signal selection part 10 is performed based on the output signal of the built in phase generator of the head drum-21. At this time, the timing of the output signal of the phase generator has an earlier phase than the digital head HD1 by a predetermined time period t2 and has an earlier phase than the analog head HA1 by a predetermined time period t3.

Therefore, when the timing of the output signal of the phase generator is as shown in FIG. 5c, the control part 14, by applying head-switching signals D-SW as shown in FIGS. 5a and 5b to the digital head part 8, switches the digital heads HD1 and HD3, and HD2 and HD4 with head-switching signals D-HSW1 and D-HSW2.

Accordingly, the outputs of the signals reproduced at the digital heads HD1 and HD3, and HD2 and HD4 switched by head-switching signals D-HSW1 and D-HSW2 as shown in FIGS. 5a and 5b have wave patterns and timings as shown in FIGS. 5j and 5k. The outputs of the reproduced signals are processed at the digital reproduction signal processing part 9 and applied to the digital signal output part 11 through the output signal selection part 10 for processing suitably for displaying on the monitor.

In the meantime, in case the phase generator has a timing as shown in FIG. 5f, the control part 14 determines whether it is a reproduction for a reproduction signal at a drum speed of 3600 rpm or at a drum speed of 1800 rpm by determining the timing of the control signal reproduced from the audio control head 25 as shown in FIG. 5h or FIG. 5i.

That is, if the timing of the control signal at digital reproduction is as shown in FIG. 5h, understanding that it is a case of 3600 rpm at Vt'=Vt reproduction, by switching the digital heads HD1 and HD3, and HD2 and HD4 with the head-switching signals D-HSW1 and D-HSW2 having timings as shown in FIGS. 5a and 5b, and if the timing of the control signal at digital reproduction is as shown in FIG. 5i, understanding that it is a case of 1800 rpm at Vt'=Vt/2 reproduction, by switching the digital heads HD1 and HD3, and HD2 and HD4 with the head-switching signals D-HSW1/2 and D-HSW2/2 having timings as shown in FIGS. 5d and 5e, a reproduction head-switching appropriate to a recorded speed can be done.

On the other hand, in case the control part 14 determines that it is an analog reproduction based on the detection signal of the comparison part 13, and controls switching of the analog recording and reproduction path selection part 3, the digital recording and reproduction path selection part 7 and the output signal selection part 10 for applying the video signal reproduced from the analog head part 4 to the analog reproduction signal processing part 5, the control signal reproduced from the audio control head 25 will be pulses having a timing as shown in FIG. 5i, and the control part 14, receiving such a signal accordingly, carries out head-switching by applying a head-switching signal A-HSW3 having a timing as shown in FIG. 5g to the analog heads HA1 and HA2 as head-switching signals.

The video signals reproduced at the analog heads HA1 and HA2 through the foregoing head-switching control have wave patterns as shown in FIGS. 5l and 5m, and these analog signals are processed with the same process as the foregoing process at the analog reproduction signal processing part 5 and applied to the analog signal output part 12 through the output signal selection part 10.

The analog signal output part 12, accordingly, presents the signals after processing the received analog video signals into analog signals suitable for displaying on the monitor.

As can be seen from the foregoing description, this invention has the following advantages.

First, since two cases of control signal selection for recording on tape, as shown in FIGS. 5h and 5i, are made available at recording and reproduction of HDTV video signals, the time period required for recording and reproduction can be extended to a maximum of two times, i.e., up to four hours, with the tape transferring speed kept the same as the conventional VHS tape standard transferring speed of 33.35 mm/sec (two hours of standard reproduction time period) or with ½ of the standard speed of 16.675 mm/sec.

Second, since VHS interchangeable recording and reproduction is made available by recording and reproducing digital signals and analog signals using the same head drum, and since analog signals can be recorded and reproduced in a pattern identical to the existing VHS recording pattern, this invention can be applicable to an existing VHS tape.

Although the invention has been described in conjunction with specific embodiments, it is evident that many alternatives and variations will be apparent to those skilled in the art in light of the foregoing description.

Accordingly, the invention is intended to embrace all of the alternatives and variations that fall within the spirit and scope of the appended claims.

What is claimed is:

1. An analog-cum-digital video recording and reproduction device, comprising:

a signal reception selection part for selecting video signals to be recorded from applied analog video signals and digital video signals;

an analog recording signal processing part for processing analog video signals received from the signal reception selection part suitable to a recording format;

an analog head part for reproduction of the analog video signals recorded on a videotape and recording the analog video signals received from the analog recording signal processing part;

an analog recording and reproduction path selection part for applying the video signals processed at the analog recording signal processing part to the analog head part for recording, or transmitting the video signals reproduced at the analog head part;

an analog reproduction signal processing part for processing the reproduced video signals selected at, and received from, the analog recording and reproduction path selection part suitable to a reproduction format;

a digital recording signal processing part for processing the digital video signals received from the signal reception selection part suitable to a recording format;

a digital head part for reproduction of the digital video signals recorded on a videotape, and recording the digital video signals received from the digital recording signal processing part;

a digital recording and reproduction path selection part for applying the video signals processed at the digital recording signal processing part to the digital head part for recording, or transmitting the video signals reproduced at the digital head part;

a digital reproduction signal processing part for processing the reproduced video signals selected at, and received from, the digital recording and reproduction path selection part suitable to a reproduction format;

an output signal selection part for selection and transmission of one signal of the signals received from the analog reproduction signal processing part and the digital reproduction signal processing part;

an audio control head for recording and reproduction of audio and control signals on and from a videotape;

a comparison part for comparing the reproduced control signals received from the audio control head to the signals received from the analog reproduction signal processing part and the digital reproduction signal processing part; and a control part for controlling the signal reception selection part, the audio control head, the analog recording and reproduction path selection part, the digital recording and reproduction path selection part, the output signal selection part, the analog head part, and the digital head part in response to the signals received from the comparison part.

2. The device as claimed in claim 1, wherein the analog head part and the digital head part are mounted on the same drum.

3. The device as claimed in claim 2, wherein the digital head part includes two pairs of digital heads, and the analog head part includes one pair of analog heads.

4. The device as claimed in claim 3, wherein the two pairs of the digital heads are mounted on the drum opposite to each other at an angle of 180 degrees.

5. The device as claimed in claim 3, wherein each analog head in the one pair of the analog heads is mounted on the drum opposite to the other analog head at an angle of 180 degrees.

6. The device as claimed in claim 3, wherein the digital heads are composed of double azimuth heads having acute azimuth angles.

7. The device as claimed in claim 6, wherein the azimuth angles of the digital heads are ±15 degrees.

8. The device as claimed in claim 3, wherein the analog heads are composed of double azimuth heads having acute azimuth angles.

9. The device as claimed in claim 8, wherein the azimuth angles of the analog heads are ±6 degrees.

10. The device as claimed in claim 3, wherein the one pair of the analog heads is mounted on the drum to have a predetermined phase angle with respect to the two pairs of the digital heads.

11. The device as claimed in claim 3, wherein one digital head pairs has a first difference of height with respect to the other pair of the digital heads.

12. The device as claimed in claim 11, wherein each of the analog heads has a second difference of height with respect to the other digital heads.

13. The device as claimed in claim 3, wherein each of the digital heads in a pair of digital heads is mounted on the drum at a small angle relative to the other digital head.

* * * * *